United States Patent Office 3,030,405
Patented Apr. 17, 1962

3,030,405
ALKYLENE-BIS-BORACYCLOOCTANES
Bernard Rudner and Mead S. Moores, Pittsburgh, Pa., assignors to Koppers Company, Inc., a corporation of Delaware
No Drawing. Filed June 20, 1960, Ser. No. 37,070
8 Claims. (Cl. 260—462)

This invention relates to novel bicyclic boracyclooctanes. In one specific aspect, it relates to bifunctional esters comprising two unfused boron-containing heterocyclic rings connected by an alkylene bridge.

Simple and useful nitrogenous esters of boron (amine borates) are well known. Steinberg & Hunter, Ind. & Eng. Chem. 49, 174–181 (1957), found the reaction product of boric acid and triisopropanolamine to be among the most resistant of the simple organic borates to solvolysis. Because of the solvolytic stability of the amine borates, amino alcohols are useful in the derivatization of boronic acids (i.e. boron derivatives containing a —C—B—OH residue). See Letsinger & Skoog, J. Am. Chem. Soc. 77, 2491 (1955). The first bicyclic amine borate was prepared by reacting triethanolamine and boric acid (Brown & Fletcher, J. Am. Chem. Soc. 73 2808 (1957)). Brown et al. noted the marked resistance to hydrolysis of the compound, chemically 1-aza-5-bora-4, 6,11-trioxabicyclo-(3.3.3)-undecane, and attributed this to the existence of a semi-polar bond between the boron and nitrogen atoms. However, because of the lack of functional groups, neither this nor similar known compounds are capable of further condensation without undergoing partial ring cleavage. Thus, although the products are known to be useful as catalysts for the formation of polymers, they are not in themselves capable of forming polymers with disrupting the ring and thus destroying their stability:

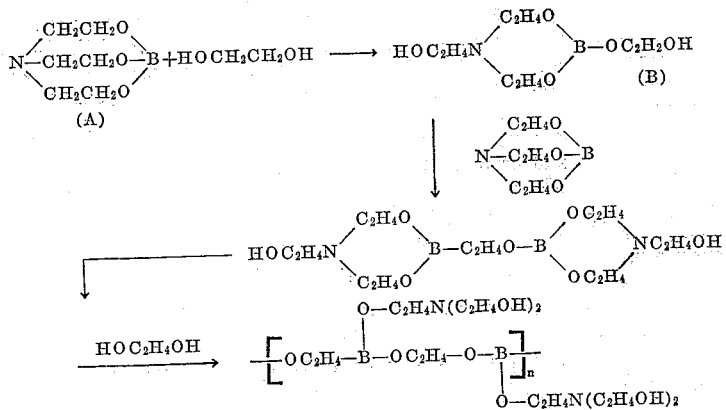

Because of the known resistance of these compounds to solvolysis (in this case glycolysis), very little polymer is formed as shown. Since the polymer no longer contains the azo-bora-dioxacyclooctane ring (as in A and B above), it no longer can resist solvolysis, and is, therefore, readily cleaved by water, alcohols, organic acids, etc.

Quite surprisingly, we have discovered a new generic class of unfused bicyclic boron compounds which have the inherent stability to solvolysis of the known amine borates and which, because of the two functional groups that they contain, are directly useful as major components in the formation of novel hydrolytically stable condensation polymers.

It is, therefore, an object of the present invention to provide a new class of basic, bicyclic boron-oxygen-nitrogen heterocycles which are useful, inter alia, in the direct preparation of new hydrolytically stable condensation polymers having remarkable utility as thickeners, fillers and surface modifiers.

In accordance with the invention, we have discovered compounds of the general formula:

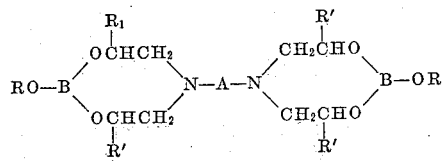

In the above formula R is a member selected from the group consisting of alkyl radicals having from 1–20 carbon atoms, vicinal epoxy lower alkyl furfuryl, tetrahydrofurfuryl and hydroxy lower alkyl, R' is hydrogen or lower alkyl, and A is a divalent normal lower alkylene chain having from 2–6 carbon atoms, which is attached to each nitrogen atom through a different carbon atom.

The basic starting materials for use in the invention are the N,N,N',N',-tetrakis-(2-hydroxyalkyl)alkylene diamines. Several of such diamines are commercially available and others are readily prepared by simple and straight forward procedures, e.g. the reaction of an alkylenediamine with an alkylene chlorohydrin.

The compounds of the invention are made from the parent alkylenebis-(iminodialkanols) in several ways, the choice of preparative method being dependent to some extent on the particular product desired. In general the best preparative method is either a direct esterification of the tetrol or a transesterification of product alkylene-bis-(aza-boradioxacyclooctane) already formed from the tetrol.

Two general transesterification routes are possible for the preparation of our novel boron compounds. The first is transesterification of the starting tetrol with an organic borate, e.g.

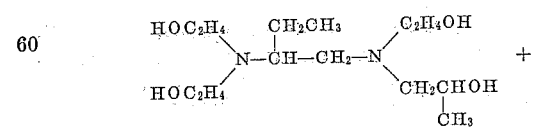

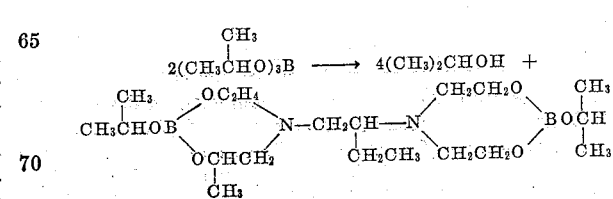

The second is reaction of one of our novel products with an alcohol, e.g.

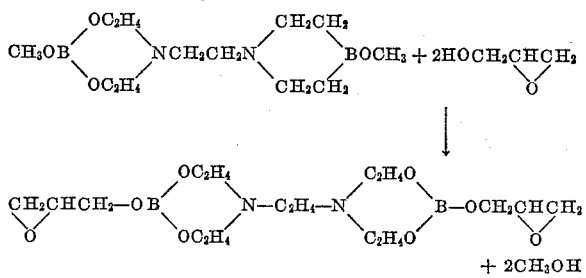

+ 2CH₃OH

The two general transesterification methods are most suitably run as distillations through a fractionating column. The use of solvent in either case is not necessary, but use of an azeotrope-forming solvent is frequently helpful, since the extent of reaction after any interval can be determined by measuring the amount of water distilled. For both reactions, at least a stoichiometric quantity of the simpler reactant (the boron ester or the alcohol, respectively) is advisable; in either case this component can be used as the solvent. The first route is preferable where R=methyl; either route is useful where R=ethyl or propyl; and the second route is most advantageous for more complex alcohols.

If the product is insoluble in the initial reaction mixture, transesterification (in either of the first two routes) goes readily at relatively low temperatures, as in Example I. But where the product is soluble, or transesterification is strongly sterically hindered, distillation temperatures of up to approximately 180° C. may be required over a period of up to approximately 24 hours.

In the transesterification procedures, it is usually more convenient to select a solvent in which the product is less soluble than the components. For solvents, we prefer anhydrous aromatic hydrocarbons (e.g. benzene) xylene, tetralin), halohydrocarbons (chloroform, bromobenzene, etc.), or ethers (dioxane, methoxyethyl ether, etc.). As mentioned earlier, the simpler liquid reactant can be used in excess as a solvent.

In those preparations where water or an alcohol is evolved, it may occasionally be desirable to run the reaction under slightly reduced pressure, particularly when a high-boiling alcohol is to be generated as co-product. The use of a blanket of dry, inert gas such as nitrogen or argon is sometimes helpful.

The products are recovered from the reaction mixture using conventional techniques. If the product is a crystalline solid, as in the case where R is methyl, ethyl or propyl, it is most easily separated from the reaction mixture by filtration, washed with a suitable solvent, and dried. If the product is an oil, as in the case where R is hexyl, it is best recovered as a residue from a vacuum distillation.

Our invention is further illustrated by the following examples.

EXAMPLE I

*1,2-Bis-(3,7-Dimethyl-5-Methoxy-5-Bora-4,6-Dioxa-1-Azacyclooctyl-1)Ethane*

29 g. N,N,N′,N′-tetrakis-(2-hydroxypropyl)ethylenediamine, commercially available as "Quadrol," 21 g. trimethylborate, and 100 ml. of chloroform were heated at 50° C. for about 15 minutes, and then held, in the absence of moisture, at room temperature overnight. Removal of all the chloroform by distillation gave impure product as sticky, hygroscopic fine white crystals. The crystals were washed with toluene, in which both reactants (and to some extent the product) were soluble, then vacuum dried over P₂O₅ at room temperature to give 1,2-bis-(3,7-dimethyl-5-methoxy-5-bora-4,6-dioxa-azacyclooctyl-1) ethane as a dry (in the absence of air) white powder, 16.5 g., M.P. 165–167° C. (M.P. 196–201° C., d. on recrystallization from chloroform). Its elemental analysis is as follows: Found: %C, 51.3; %H, 9.2; %B, 6.0; %N, 7.3, calculated for C₁₆H₃₄B₂N₂O₆ %C, 51.6; %H, 9.2; %B, 5.8; %N, 7.5.

EXAMPLE II

*1,2-Bis-(3,7-Dimethyl-5-Methoxy-5-Bora-4,6-Dioxa-1-Azacyclooctyl-1)Ethane*

The reaction of Example I was repeated with double the charge size, but the temperature of the mixture was held at 100° C. for one hour, and the solvent was distilled off until a precipitate began to form in the still pot. The residue was cooled and filtered to give 36.0 g. of the product, M.P. 165–167° C. (M.P. 196–201° C., d. on recrystalization from chloroform). The distillate consisted in part of a methanol-containing azeotrope, B.P. 54° C., in amounts indicative of a near-quantitative reaction. Partial evaporation of a combined filtrate and toluene wash of the filter cake gave an additional 8.8 g. of less pure product.

The recrystallized product was found by elemental analyses to contain 7.5% N and 5.8% B. The theoretical percentages for the compound C₁₆H₃₄O₆N₂B₂ are 6.8% and 5.8% respectively. The novel borate, as a mull, shows strong absorption maxima at 8.35, 8.75, 8.90, 9.05 and 12.56 microns. Its infrared absorption spectrum, like its X-ray diffraction pattern, proves it to be distinctly different from triethanolamine borate and higher condensation products.

EXAMPLE III

*1,2-Bis-(5-Butoxy-5-Bora-4,6-Dioxa-1-Azacyclooctyl)-Ethane*

A solution of 59.1 g. tetrakis-(2-hydroxyethyl)ethylenediamine and 115.1 g. tri-n-butyl borate in 100 ml. of toluene was refluxed in a dry N₂ atmosphere for 2 hours, then distilled over a period of 4 hours to collect, as an azeotrope, 62 g. of 1-butanol (84% of the theoretical yield). During distillation a glass precipitated which, in the absence of stirring, tended to char. Cooling and decanting gave 42.6 g. of crude yellow, glassy product. Recrystallization from chloroform converted this to deliquiscent white crystals sintering at 150° C. and melting at 195–200° C. Evaporation of the filtrate and recrystallization liquors gave more product, contaminated by higher condensates. Despite its relatively high molecular weight and carbon content, the product is somewhat soluble in water.

When the reaction was run in chloroform, a lower yield of less pure product was obtained.

EXAMPLE IV

*1,2-Bis-(3,7-Dimethyl-5-n-Butoxy-5-Bora-4,6-Dioxa-1-Azacyclooctyl-1)-Ethane*

A solution of 29.2 g. N,N,N′,N′-tetrakis-(2-hydroxypropyl)ethylenediamine, and 46.0 g. tri-n-butyl borate in 100 ml. chloroform (mixing gave a weak exotherm) was refluxed 3½ hours in the absence of moisture, allowed to stand at room temperature overnight, and then evaporated in vacuo at room temperature until crystals started to precipitate (about 100 g. of material were removed by evaporation, up to this point). After standing at room temperature, the mixture yielded 17.8 g. of vacuum-dried white product, M.P. 139–144° C. Recrystallization raised the melting point to 150–154° C. An additional 15.5 g. washed and dried crystals were obtained as a second colorless crop of only slightly less pure product, bringing the isolated yield up to 62% of the theoretical. Additional product was obtainable from the mother liquor, washes and recrystallization filtrates. The colorless, crystalline bicyclic condensate is very soluble in water and ethyl and isopropyl alcohols, soluble in acetone, and less soluble in ethyl acetate, benzene and ether. Its melts show a marked tendency to form glasses on cooling.

EXAMPLE V

1,2-Bis-(3,7-Dimethyl-5-Tetrahydrofurfuryloxy-5-Bora-4,6-Dioxa-1-Azacyclo-Octyl-1-)Ethane A test tube equipped with a 2-hole rubber stopper was charged with 0.372 g. (0.001 mole) of the product of Example II and 0.408 g. (.004 mole, a 100% excess) of tetrahydrofurfuryl alcohol, then shaken well to mix the contents. With a slow stream of nitrogen passing through the tube, the lower portion of the tube was maintained at 55–65° C. and the top was kept at room temperature until the tube no longer lost weight. In approximately twenty-four hours, the tube reached a constant weight loss of 0.26 g., indicative of a 97% complete reaction. The soft solid product was off-white in color, and clearly soluble in water, ethanol, and "diglyme." It was too hygroscopic to permit a melting point determination.

EXAMPLE VI

1,2-Bis-(3,7-Dimethyl-5-Furfuryloxy-5-Bora-4,6-Dioxa-1-Azacyclooctyl-1-)Ethane A mixture of the product of Example IV (1.354 g.) and furfuryl alcohol (0.635 g.) was heated in a test tube as follows: 30 minutes from 25 to 120°, five minutes from 120 to 150°, during which time a clear amber solution was formed, then ten minutes at 150°. The mixture was heated at 150° in vacuo to a constant weight of 1.484 g. or 99.3% of theory. The crude product melted at 193–198°, with decomposition. After crystallization from furfural alcohol the product melted at 201–206°, with decomposition. The somewhat hygroscopic crystals were soluble in water (alkaline solution), acetone, dimethylformamide, dioxane, nitrobenzene, chloroform and furfural alcohol. The product was insoluble in diethyl ether, tetrahydrofuran, ethyl acetate and benzene.

EXAMPLE VII

1,2-Bis-5(Methoxy-5-Bora-4,6-Dioxa-1-Azacyclooctyl)-Ethane

Tetrakis - (2 - hydroxyethyl)ethylenediamine, 118.2 g. (0.5 m.) dried by azeotropic distillation with chloroform, was dissolved in about 950 ml. of chloroform, and treated with 103.9 g. (1 mole) of methyl borate, and the mixture was allowed to reflux ½ hour before being slowly distilled. Methanol-chloroform azeotrope was collected as distillate over two hours, and distillation was continued for an equal period thereafter. The clear yellow liquid residue was then evaporated under reduced pressure until a solid precipitated, and stored overnight at 4° C. before being filtered. This first precipitate, 162 g., was a chloroform solvate of the product, white crystals, melting at 61–4° C., soluble in water, alcohol and chloroform, but poorly soluble in acetone or isopropyl alcohol.

EXAMPLE VIII

3,7 - Dimethyl - 5 - Methoxy - 1 - [2 - (3 - Methyl - 5 - Methoxy - 1 - Aza - 5 - Bora - 4,6 - Dioxacyclooctyl-1)Ethyl]-1-Aza-5-Bora-4,6-Dioxacyclooctane Repetition of the procedure of Example VII, using the commercially available N,N,N',-tris-(2-hydroxypropyl)-N'-(2-hydroxyethyl)ethylenediamine gave the crystalline, highly hygroscopic chloroform solvate of the 3,3',7-trimethyl homolog of the product of Example VII.

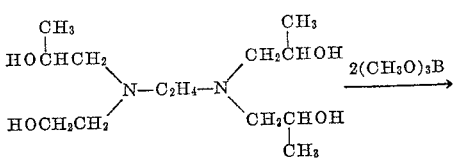

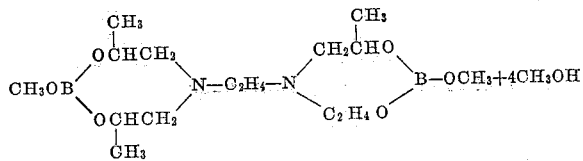

Although this unsymmetrical compound is very similar in structure to the product of Examples I and II, it is much less tractable showing a marked tendency to sinter at room temperature.

EXAMPLE IX

1,2-Bis-(5-(2,3-Epoxypropoxy)3,7-Dimethyl-5-Bora-4,6-Dioxa-1-Azacyclooctyl)Ethane Repetition of Example V, using instead of tetrahydrofurfuryl alcohol, 0.3 g. of glycidol held at 100° C. gave an 80% yield (based on weight loss) of the novel white semisolid 1,2 - bis - (5 - (2,3 - epoxypropoxy) - 3,7 - dimethyl - 5 - bora - 4,6 - dioxa - 1 - azacyclooctyl)ethane, which melted clear at 67°. This hygroscopic solid reacted exothermically with diamines to form partly water-soluble polymers.

EXAMPLE X

1,2-Bis-(3,7-Dimethyl-5-n-Butoxy-5-Bora-4,6-Dioxa-1-Azacyclooctyl-1-)Ethane

A solution of 146.2 g. tetrakis(2-hydroxypropyl)ethylene diamine and 61.8 g. boric acid in 500 ml. n-butanol was azeotropically distilled over 24 hours (fresh alcohol being added as necessary). The distillate contained 49.7 g. water, 92% of the theoretical amount. Partial evaporation of the distillation residue, then dilution to 1000 ml. with ethyl ether gave as a first crop 65.3 g. of the product of Example IV.

EXAMPLE XI

1,2-Bis-(5-n-Octadecyloxy-3,7-Dimethyl-5-Bora-4,6-Dioxa-1-Azacyclooctyl)Ethane A mixture of 28.0 g. of the product of Example I and 40.6 g. of n-octadecanol was stirred at 80–90° C. and 10–15 mm. Hg pressure for 3 hours, then slowly heated to, and kept at, 165° and 0–5 mm. of Hg during three hours. The mixture gradually became clear and completely fluid, at about the time 90% of theoretical methanol content had been removed. The waxy white product was easily powdered; it could readily be distinguished from the starting materials by its solubility in benzene and insolubility in hexane and acetone. Calculated for $C_{50}H_{102}N_2B_2O_6$: percent C, 70.7; percent H, 12.1; percent N, 3.3; percent B, 2.55. Found: percent C, 71.9, percent H, 12.1; percent N, 3.2; percent B, 2.9.

EXAMPLE XII

Polymer Formation 1.186 g. of the product of Example IV and 0.161 g. of ethylene glycol in a lightly corked, tared test tube were held at 100° (bath temperature) for ½ hour while being occasionally stirred with a copper wire. During the next 15 minutes, in which the homogeneous slurry was held at 125°, n-butyl alcohol started distilling from the reaction mixture. On heating at 150° C. for 10 minutes, a portion of the solid dissolved. A clear melt was obtained at 200° C. The mixture was held at 200° for 10 minutes, subjected at 200° to a 0.1 mm. vacuum for 10 minutes, and then allowed to cool under vacuum to give 0.95 g. (98% of the theoretical yield) of clear white polymer, part of which presumably contained

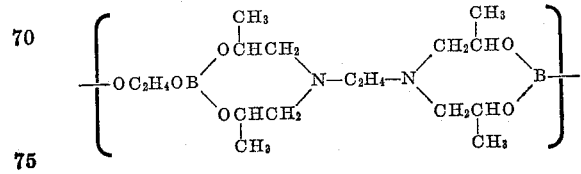

residues. The novel polymer decomposes without melting on a hot plate, burns with a green flame (contains boron), and is insoluble in cold water, boiling ethanol, ethyl acetate and dimethyl formamide.

EXAMPLE XIII

*Condensation of 1,2-Bis-(3,7-Dimethyl-5-Butoxy-5-Bora-4,6-Dioxa-1-Azacyclooctyl-1-)Ethane With Pentaerythritol*

A dry mixture of 1.337 g. of the product from Example IV and 0.199 g. of pentaerythritol was heated in a test tube to 160° in 25 minutes, then kept at 160° for an additional 22 minutes as the water white liquid was devolatilized in vacuo. The residue was a clear, water white glass that was easily pulverized to a somewhat hygroscopic powder that melted at 90–100°. It was soluble in isopropanol, dimethylformamide, chloroform and water.

EXAMPLE XIV

*Condensation of 1,2-Bis-(3,7-Dimethyl-5-Butoxy-5-Bora-4,6-Dioxa-1-Azacyclooctyl-1-)Ethane with Bisphenol A*

An equimolar mixture of the product from Example IV and Bisphenol A were heated to 150° in a test tube over a period of 25 minutes, then held at 150° for an additional 15 minutes as butanol distilled over. As the mixture was heated it melted between about 110° and 125°. The water white clear liquid residue was devolatilized in vacuo at 150° for one hour, then the temperature was raised rapidly to 200° under vacuum to effect complete removal of butanol. The colorless glassy product melted between about 170° and 180°; it was soluble in ethanol and in acetone, but insoluble in water, ethyl acetate or benzene.

Our novel products exhibit a wide range of utility as polymer formers. Thus, the condensation products of Examples VII–IX show how our products can be converted to simple condensates, useful as thickeners, fillers, surface modifiers or block-polymers. The condensates are more specifically described and claimed in our copending application, S.N. 860,064, filed December 17, 1959. More complex polymeric condensates are, of course, preparable from the epoxyboracyclooctane derivatives and the furfuryl ester.

We have also found our polymer-formers of value in retarding phenol-formaldehyde condensation beyond the first step. Thus, a solution made by mixing resorcinol, formaldehyde, and the product of Example I in water, is stable in storage at up to about 60° C.; addition of acid or alkali results in the formation of a resorcinol-aldehyde condensate containing basic nitrogen. In the absence of our novel product, resorcinol condenses rapidly with formaldehyde below 60° C., and the presence of a simple amine borate such as triethanolamine borate does not inhibit this condensation.

The polymer-forming properties of our novel heterocyclic compounds also make them useful in animalizing vegetable fibers. Thus, paper impregnated with an aqueous solution of the product of Example I, then vacuum-dried at 80° C. not only exhibits increased flame resistance, but also shows much greater affinity for acidic dyes than does untreated paper. Other compounds of the present invention can be used to form other types of polymers, as shown in the following example:

EXAMPLE XV

A mixture of 18.6 g. of the product of Example I (0.05 m.) and 13.2 g. (0.1 m.) 2,2-diethyl-1,3-propanediol (alternately 3,3-bis(hydroxymethyl)pentane) was held at 80° C. under approximately 10 mm. vacuum until the original heterogeneous mixture of liquid and solid had become a clear liquid that no longer evolved gas ($CH_3OH$). During that time (about 1 hour) roughly the theoretical quantity of methanol had evolved. The residue in the flask, a quantitative yield of crude 1,2-bis-[5-(2-ethyl-2 - hydroxymethyl)butoxy-3,7-dimethyl-1-aza-5-bora-4,6-dioxacyclooctyl] ethane, was a very viscous, clear, light yellow liquid, almost a glass. Unlike the starting methyl ester, it formed limpid solutions in ether and chloroform. Such solutions react exothermically with diepoxides, e.g. butadiene dioxide, and diisocyanates, e.g. toluene-2,4-diisocyanate, to yield polymers.

In addition to the polymer-forming ability, the compounds are also useful as plasticizer-stabilizers, gasoline additives, and fungicides.

This application is a continuation-in-part of our copending application S.N. 860,071, filed December 17, 1959 and now abandoned.

We claim:
1. A compound of the formula:

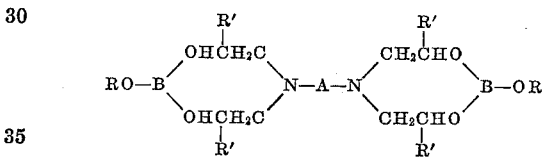

wherein R is a member selected from the group consisting of alkyl radicals having from 1–20 carbon atoms, epoxy lower alkyl, furfuryl, tetrahydrofurfuryl and hydroxy lower alkyl; R' is a member selected from the group consisting of hydrogen and lower alkyl and A is a divalent normal lower alkylene chain having from 2–6 carbon atoms which is attached to each nitrogen atom through a different carbon atom.

2. A compound of claim 1 wherein R is an alkyl radical having from 1–20 carbon atoms and R' is lower alkyl.

3. 1,2-bis-(3,7-dimethyl-5-methoxy-5-bora-4,6-dioxa-1-azacyclooctyl)ethane.

4. 1,2-bis-(5-butoxy-5-bora-4,6-dioxa-1-azacyclooctyl)ethane.

5. 1,2-bis-(3,7-dimethyl-5-octadecoxy-5-bora-4,6-dioxa-1-azacyclooctyl)ethane.

6. 1,2-bis-(3,7-dimethyl-5-furfuryloxy-5-bora-4,6-dioxa-1-azacyclooctyl)ethane.

7. 1,2-bis-(3,7-dimethyl - 5-butoxy - 5-bora-4,6-dioxa-1-azacyclooctyl)ethane.

8. 1,2-bis-[5-(2-ethyl - 2-hydroxymethyl)butoxy-3,7-dimethyl-1-aza-5-bora-4,6-dioxacyclooctyl]ethane.

No references cited.